United States Patent [19]

Yoneya

[11] 4,170,196

[45] Oct. 9, 1979

[54] FISH REARING ENCLOSURE WITH A READILY CLOSABLE MOUTH

[75] Inventor: Kiyoo Yoneya, Kurobe, Japan

[73] Assignee: Yoshida Kogyo, K. K., Tokyo, Japan

[21] Appl. No.: 761,085

[22] Filed: Jan. 21, 1977

[30] Foreign Application Priority Data

Jan. 24, 1976 [JP] Japan ............................. 51-6629[U]

[51] Int. Cl.² ............................................ A01K 63/00
[52] U.S. Cl. ...................................................... 119/3
[58] Field of Search .................. 119/2, 3, 4; 43/7, 14, 43/105; 150/3; 190/41 Z

[56] References Cited
U.S. PATENT DOCUMENTS

| | | | |
|---|---|---|---|
| 2,477,563 | 8/1949 | Angus .................................. | 150/3 X |
| 2,603,028 | 7/1952 | Roberts ................................. | 43/55 |
| 2,989,945 | 6/1961 | Ford ..................................... | 119/4 |
| 3,073,367 | 1/1963 | Samara ................................. | 150/3 X |
| 3,164,231 | 1/1965 | Kryznoski ....................... | 190/41 Z X |
| 4,003,338 | 1/1977 | Neff et al. ............................. | 119/3 |
| 4,044,432 | 8/1977 | Ebata .................................. | 43/14 X |

*Primary Examiner*—Hugh R. Chamblee
*Attorney, Agent, or Firm*—A. C. Nolte, Jr.; Edward B. Hunter

[57] ABSTRACT

A fish rearing enclosure includes framework which is netted to provide an enclosed space for accommodating marine fish to be cultured. A slide fastener or fasteners are attached to the top portion of the net to form a mouth which can be opened and closed by manipulation of the fastener slider or sliders. Several embodiments are disclosed.

5 Claims, 3 Drawing Figures

4,170,196

FISH REARING ENCLOSURE WITH A READILY CLOSABLE MOUTH

BACKGROUND OF THE INVENTION

1. Field of the Invention

This invention relates generally to devices used in the art of fish culture, and in particular to a net or netted enclosure for confining the young of fish, especially marine fish such as yellowtails and "tai" (Pacific porgies), and for rearing them in sea waters until they grow into adults. Even more particularly, the invention deals with such a fish rearing enclosure having a mouth at its top which can be readily opened or closed.

2. Prior Art

In the art of marine fish culture by use of fish rearing enclosures of the type under consideration, one of the most serious problems is how to protect the confined fish from the attack of the so-called "red tide", which is a discoloration of the surface waters of the sea by the presence of dinoflagellates in concentrations fatal to fish and other forms of marine life. When notified of an oncoming red tide, therefore, fish cultivators must quickly close the mouths of their fish rearing enclosures, if necessary, and submerge same down to the depths of the sea where the confined fish will be free from the effects of the red tide. Upon disappearance of the red tide, the enclosures may again be lifted to the surface of the sea, and their mouths may be re-opened.

Since the fish cultivators are inevitably required to work on insecure footings on the surface of the sea, however, the closing and opening of the mouths of the fish rearing enclosures as heretofore constructed has been a highly troublesome and timecomsuming procedure. This disadvantage of the prior art is not to be overlooked since any delay in the submersion of the fish rearing enclosures may result in the death of the confined fish by suffocation.

SUMMARY OF THE INVENTION

It is an object of this invention to provide a fish rearing enclosure for particular use in marine fish culture which has a mouth so made that it can be easily and speedily opened or closed.

Another object of the invention is to provide a fish rearing enclosure of the above described character which can be manufactured economically.

In accordance with this invention, briefly stated, there is provided a fish rearing enclosure comprising framework, and net covering the framework and coacting therewith to provide an enclosed space for accommodating fish to be reared. Attached to a top portion of the net is a slide fastener adapted to provide a mouth which can be opened and closed by operating the slide fastener.

In one embodiment of the invention, a slide fastener is employed which is so disposed as to surround at least part of the top portion of the net, so that by opening the fastener, the said surrounded part can be separated from the rest of the net. Where the slide fastener is provided with a separable type bottom end, the surrounded part can be completely removed from the rest of the net. In another embodiment, four slide fasteners are disposed in the form of a cross on the top portion of the net, so that when all the fasteners are opened, the top portion of the net is separated into four triangular portions. In still another embodiment, a slide fastener is attached to the top portion of the net in the shape of a U.

Thus, in all the embodiments disclosed herein, the mouths of the fish rearing enclosures can be readily opened and closed by manipulating the slider or sliders of the slide fastener or fasteners in the usual manner. It is therefore apparent that the above noted disadvantage of the prior art can be overcome in a simple and thoroughly practicable manner.

The above and other objects, features and advantages of this invention and the manner of attaining them will become more apparent, and the invention itself will be best understood, from the following detailed description of several embodiments, which is to be read in connection with the accompanying drawings.

DESCRIPTION OF THE PREFERRED EMBODIMENTS

Figure 1:
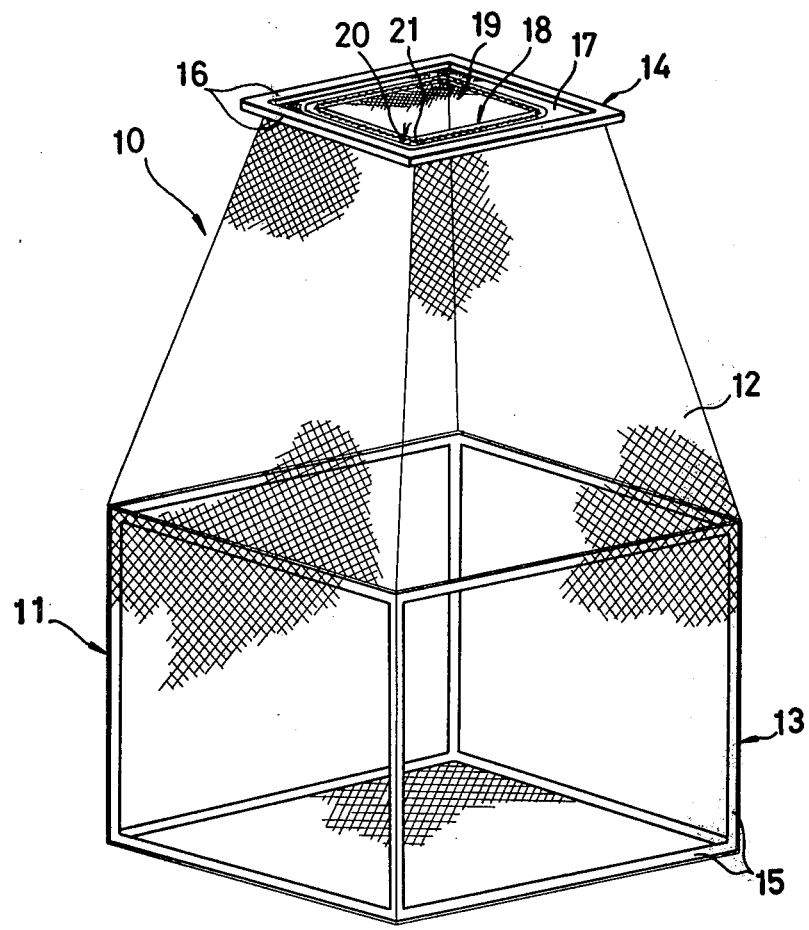
FIG. 1 is a perspective view of a preferred form of the fish rearing enclosure according to this invention.

Referring now in detail to the embodiments herein chosen for the purpose of illustrating this invention, there is shown in FIG. 1 of the accompanying drawings one of such embodiments wherein the invention is applied to a fish rearing enclosure, generally designated 10, that is suitable for use with fish whose habitat is comparatively close to the surface of the sea. The fish rearing enclosure 10 is constituted of two basic components; framework 11 and net 12 which coact with each other to provide an enclosed space for accommodating fish to be reared.

In this particular embodiment, the framework 11 comprises a main frame 13 of iron or like submersible material, and a floating top frame 14 of wood or other material. The main frame 13 is fabricated of a plurality of straight frame members 15 which are conveniently joined to each other at their ends into a generally box-like structure. The floating top frame 14 is also fabricated of a plurality of straight frame members 16, of wood or the like, that are conveniently combined into the shape of a rectangle suitably less in size than the horizontal section of the main frame 13.

The net 12, which can be formed of any suitable netting material such as that used for fishing nets, covers all but the top of the main frame 13 and further extends upwardly to be attached to the floating top frame 14. Since the top frame 14 is less in size than the horizontal section of the main frame 13 as aforesaid, that portion of the net 12 which extends between the main and the top frames is shaped into the frustum of a four-sided pyramid.

In accordance with a feature of this invention, a top portion 17 of the net 12, bounded by the floating top frame 14, is provided with a slide fastener 18 which in this particular embodiment, is disposed rectangularly so as to surround at least part of the top portion of the net. Thus, the top portion 17 has formed therein a mouth openably closed by a cover 19, which also is made of net.

The slide fastener 18 has, as usual, a pair of stringers which are stitched or otherwise secured to the periphery of the cover 19 and to the marginal edge of the top portion 17 of the net 12, respectively. Also included in the slide fastener 18 are a slider 20 movable along the interlocking rows of fastener elements or scoops of the stringers, and a usual bottom end stop 21 at the bottom end of the fastener.

Thus, the cover 19 can be selectively opened or closed by manipulating the slider 20 along the rows of fastener elements or scoops in the usual manner. In the normal use of this fish rearing enclosure 10, the cover 19 can be partly separated from the enclosure. Where a separable bottom end stop of the box-and-pin type is used instead of the usual bottom end stop 21, the cover 19 can be completely removed from the enclosure.

Figure 2:
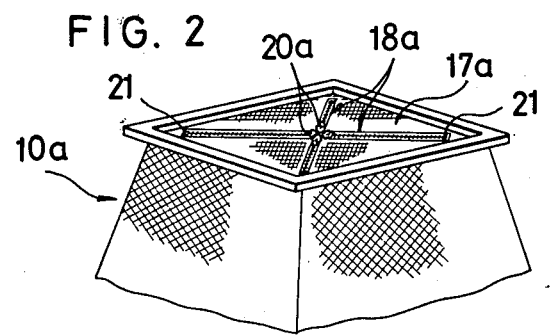
FIG. 2 is a fragmentary perspective view of a modified form of the enclosure of FIG. 1.

Shown in FIG. 2 is a modification of the preceding embodiment wherein four slide fasteners 18a are employed to form a mouth in the top portion 17a of the net 12 of the fish rearing enclosure generally designated 10a. The four slide fasteners 18a are arranged in the form of a cross, with their bottom ends 21 located at or adjacent the respective corners of the top portion 17a of the net 12 and with their top ends located at the crossing point of the cross. When the slide fasteners 18a are all closed, the sliders 20a are located at the crossing point of the cross.

By moving the sliders 20a of these fasteners toward the respective corners of the top portion 17a of the net 12, the mouth of this fish rearing enclosure 10a can be opened by being separated into four triangular portions. Other details of the fish rearing enclosure 10a are identical with those set forth above in connection with the enclosure 10 of FIG. 1, so that their description is omitted.

Figure 3:
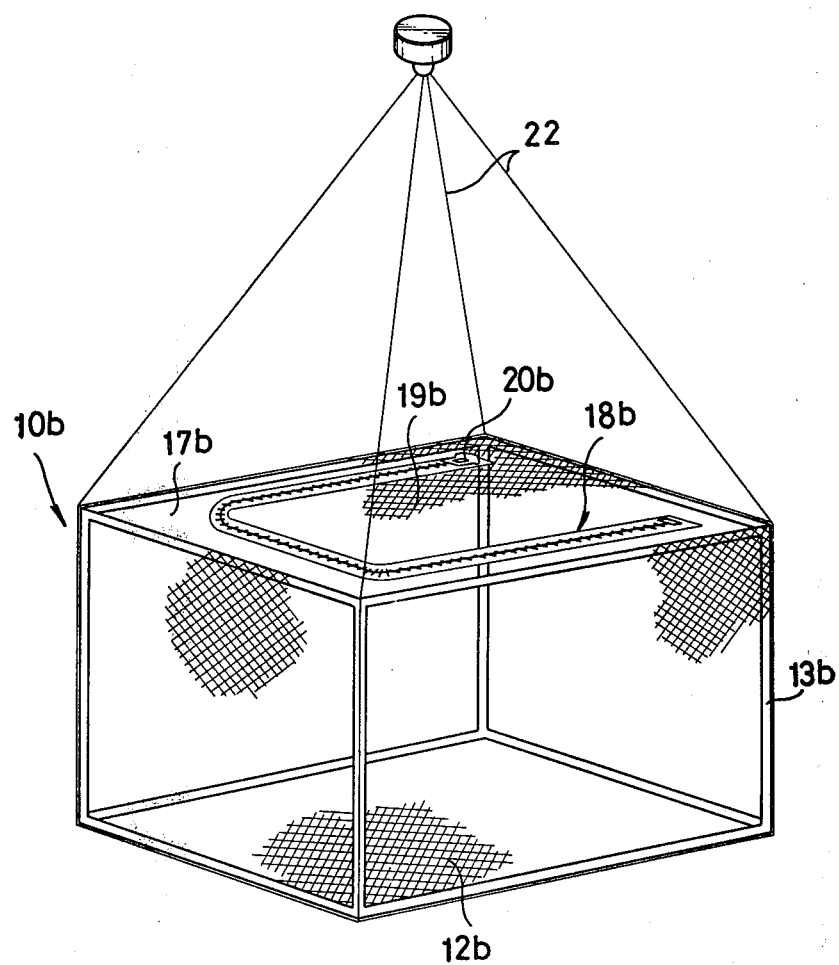
FIG. 3 is a perspective view of another preferred form of the fish rearing enclosure according to the invention.

In another embodiment shown in FIG. 3, the invention is applied to a fish rearing enclosure 10b suitable for use with fish whose habitat is deeper than that of the fish to be reared in the enclosure 10 and 10a of FIGS. 1 and 2. The framework of this fish rearing enclosure 10b includes only a frame 13b, which is similar to the main frame 13 shown in FIG. 1, and has no floating top frame since the enclosure is intended to be submerged under the sea by being suspended from a suitable structure via cords 22 or the like fastened to the corners of the top of the frame 13b. Net 12b covers all the sides, top, and bottom of the frame 13b to bound a space for accommodating fish.

Characteristic of this fish rearing enclosure 10b is a slide fastener 18b which is attached to the top portion 17b of the net 12b in the shape of the letter U to provide a mouth openably closed by a cover 19b which is formed by a central part of the top portion of the net. By manipulating the slider 20b of the slide fastener 18b in the fastener opening direction, therefore, the cover 19b can be opened substantially in the fashion of a hinged lid or the like. It will be apparent that the enclosure 10b can also be employed for rearing fish whose habitat is close to the surface of the sea, if the netted frame 13b is fastened directly to a suitable raft or the like.

As will be apparent from the foregoing, in all the fish rearing enclosures 10, 10a and 10b disclosed herein, the mouth can be selectively opened or closed by operating the slide fastener or fasteners in the usual manner. Thus, in the event of a red tide, for instance, the enclosures can be readily submerged to a safe depth of the sea upon closure of their mouths, without the danger of allowing the fish to escape therefrom. The enclosures may of course be quickly lifted to the usual habitat of the fish upon disappearance of the red tide. The use of the slide fastener or fasteners in accordance with this invention has the additional advantage that the enclosures including the covers are simple in structure and need only minimum amounts of net, so that they can be manufactured economically.

Although this invention has been shown and described in terms of its exemplary embodiments, it is understood that all such embodiments are merely for the purpose of illustrating the invention. Numerous changes or modifications may be made within the spirit and scope of the invention as expressed in the following claims.

I claim:

1. A fish rearing enclosure comprising, in combination, a sinking framework having spaced frame elements, a separate and discrete floating top frame providing an open top portion of predetermined size and smaller in horizontal section than said sinking framework, flexible net means for covering said framework and for extending to and connecting said floating top frame and for covering said open top portion thereof and coacting therewith to provide an expanded enclosed space maintained by said framework and said net means for accommodating fish to be reared, slide fastener means attached to the portion of said net means covering said open top portion of said floating top frame so as to provide a mouth substantially equal in size to said portion of said floating top frame by opening said slide means, whereby said floating top frame may be manipulated quickly and independently within the range of flexibility of said net means.

2. A fish rearing enclosure as claimed in claim 1, wherein said slide fastener is of the separable bottom end stop type and a surrounding part of said top portion is completely separable from said net by opening said slide fastener means.

3. A fish rearing enclosure as claimed in claim 1, wherein said slide fastener means is attached to said top portion of said net in the shape of a U.

4. A fish rearing enclosure comprising, in combination a sinking framework having spaced frame elements, a separate and discrete floating top providing an open top portion of predetermined size and smaller in horizontal section than said sinking framework, flexible net means for covering said framework and for extending to and connecting said floating top frame and for covering said open top portion thereof and coacting therewith to provide an expanded enclosed space maintained by said framework and said net means for accommodating fish to be reared, and a plurality of slide fastener means attached to the portion of said net covering said open top portion of said floating top frame so as to provide a mouth substantially equal in size to said floating top frame by opening said slide fastener means in a plurality of directions, whereby said floating top frame may be manipulated quickly and independently within the range of flexibility of said net means.

5. A fish rearing enclosure as claimed in claim 4, wherein said plurality of slide fastener means are disposed in the form of a cross with their sliders located at the crossing point whereby said mouth is opened by being separated into four portions when said slide fasteners are opened.